Feb. 25, 1947.  J. R. SMYTH  2,416,651
STORAGE BATTERY
Filed July 14, 1943

INVENTOR.
JOHN R. SMYTH
BY
Kwis Hudson Boughton & Williams
ATTORNEYS

Patented Feb. 25, 1947

2,416,651

UNITED STATES PATENT OFFICE 2,416,651

STORAGE BATTERY

John R. Smyth, East Cleveland, Ohio, assignor to Willard Storage Battery Company, Cleveland, Ohio, a corporation of Virginia Application July 14, 1943, Serial No. 494,673

2 Claims. (Cl. 136—6)

This invention relates to batteries and particularly to storage batteries of the flashlight type, and has for its object to provide a battery which can be produced relatively inexpensively and which is efficient in operation.

The invention relates particularly to the bottom terminal of the battery which is generally formed of lead. In accordance with the present invention, this bottom terminal is in the form of a cup which extends across the entire bottom of the battery and in fact forms the bottom of the battery, thus permitting the casing in the preferred form of the invention to be made of a section of an extruded tube instead of being molded, thus materially reducing the expense of the battery.

The invention may be further briefly summarized as consisting in certain novel details of construction and combinations and arrangements of parts which will be described in the specification and set forth in the appended claims.

In the accompanying sheet of drawings showing the preferred embodiment of the invention, Fig. 1 is a vertical sectional view of my improved battery;

Figure 2:
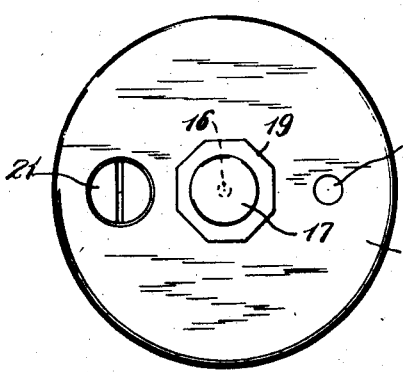
Fig. 2 is a top plan view.

Referring now to the drawings, 10 represents the casing of the battery which is of tubular form, and 11 and 12 represent, respectively, positive and negative plates which, as usual, are separated by strips of insulation 13. The positive plates 11 have upstanding lugs 14 which are connected to a strap 15 from which extends a conductor 16 with a terminal 17 located preferably at the central top of the cover 18. In this instance both the casing 10 and the cover 18 are formed of suitable insulating material, such as polystyrene. As here shown, the cover is fitted over the tubular casing 10 and cemented thereto. The conductor 16 extends through a lead bushing 19 which can be cast with an opening therethrough, and the top terminal 17 is formed by lead-soldering the upper end of the conductor to the lead bushing 19. If desired, the bushing 19 may be formed by pouring molten lead around the upper end of the conductor 16, in which event the conductor will become fused in the body of lead forming the bushing 19 which then becomes the top terminal. Additionally, the cover 18 is provided with a vent opening 20 and a filler plug 21.

It is to be noted that, as here shown, the casing 10 is tubular in form and is preferably produced from an extruded tube made in a tube mill and cut into suitable lengths. Thus the casing 10 can be formed very inexpensively as compared with a casing which is molded with an integral bottom. It will be noted that in this instance I form the bottom of the casing 10 from a lead cup 22 constituting the bottom terminal which cup is provided with an upstanding flange 23 fitting closely about a reduced part 24 formed at the lower end of the casing 10. Preferably also the cup-shaped bottom terminal 22 is provided with a groove 25 which receives the extreme lower end of the reduced part 24 of the tubular casing 10. The cup-shaped bottom terminal is pressed onto the reduced end of the tubing or casing 10 and is sealed with a suitable cement or sealing compound. Before assembling the cup-shaped bottom terminal 22 and the casing or tube 10, I prefer to coat the upstanding walls of the terminal 22 both on the inside and outside with a suitable acid-resistant material in the form of a coating compound to which has been added a solvent for the polystyrene. This solvent will soften the polystyrene as well as the coating compound and will provide an excellent bond between the bottom terminal 22 and the reduced lower end 24 of the casing 10 when the solvent dries. I prefer to use a coating compound having a vinyl resin base with a suitable hydrocarbon solvent which serves to soften both the vinyl resin and the polystyrene of the casing 10. The inside portion of the lead cup-shaped bottom terminal 22 may or may not be coated inasmuch as it is covered with an insulating pad 29 for a purpose to be explained. The tongue and groove joint formed by the groove 25 and by the lower end of the tubular casing 10 fitting therein assists in effectively sealing the battery against leakage.

The negative plates are also provided with upstanding lugs 26 which are connected by a strap 27. The strap 27 is suitably connected to the bottom terminal 22. In this instance, the middle negative plate, designated 12a, has a bottom lug 28 which extends into an opening in the bottom terminal 22 and is connected to the bottom terminal 22 by pouring molten metal into this opening as shown at 22a, but, if desired, the bottom lug 28 may be extended through an opening in the bottom terminal 22 and lead-burned therein. However, it is not essential that the bottom lug 28 be on the middle plate as, it may be provided on any one of the negative plates.

It will be understood that the plates 11, 12, and 12a rest upon the insulating pad 29 and thus remain out of contact with the lead cup-shaped bottom terminal 22.

Figure 3:
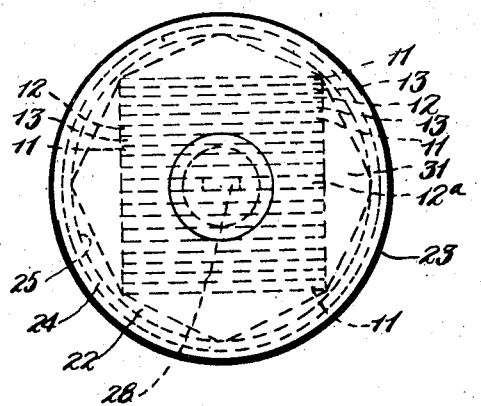
Fig. 3 is a bottom view.
Figure 1:
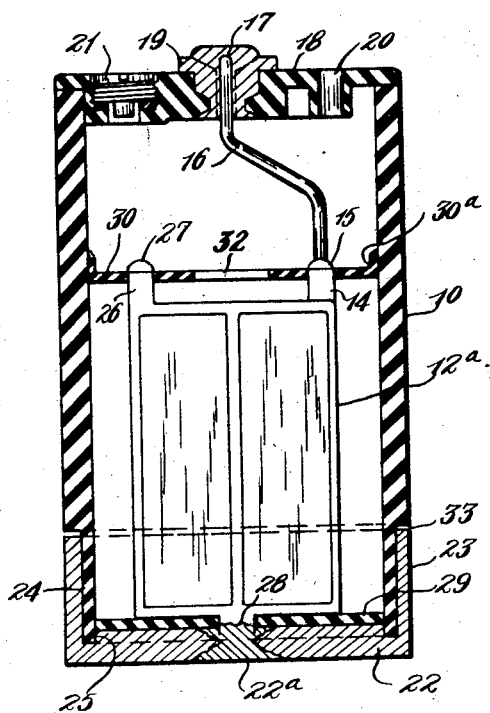

The lugs 14 extending from the positive plates and the lugs 26 extending from the negative plates pass through slots formed in a baffle 30, this baffle assisting in holding the battery plates from movement and also holding down an insulating liner which is preferably placed around the plates between the plates and the casing 10. This liner is indicated at 31 in Fig. 3. The baffle 30 has an upstanding flange 30a which engages the inner wall of the casing 10 and is cemented in place. The baffle has a central opening 32.

It is to be understood that the upper end of the flange 23 of the cup-shaped bottom terminal 22 does not quite meet the shoulder formed at the upper end of the reduced portion 24 of the polystyrene casing or tube 10. This slight space 33 is provided to serve as an expansion joint between the bottom terminal and the casing 10.

Although the present invention attains its greatest utility when the casing is in the form of a tube and the cover 18 is a separate member and applied thereto, it also has application to a molded container where the cover or top is integral with the side wall of the casing and suitable openings provided in the top to permit it to function as a cover. In this instance, after the conductor 16 is lead-burned in place to form the top terminal the lead cup 22 is applied and cemented to the casing as before.

Thus it will be seen that the objects of the invention are attained very effectively by the construction illustrated, and while I have shown the preferred embodiment of the invention, I do not desire to be confined to the precise details illustrated and described but aim in my claims to cover all modifications which do not involve a departure from the spirit and the scope of the invention.

Having thus described my invention, I claim:

1. In a storage battery, the combination of a tubular casing formed of insulating material, positive and negative plates within said casing, an insulating closure member having a filling opening therein secured to one end of said tubular member, a terminal member carried by said closure member, a metal closure member having an annular peripheral flange cemented to the other end of said casing, a conductor connected to the plates of one polarity and to said terminal member, and means for connecting the plates of opposite polarity to said metal closure member, said metal closure member having inside of said flange a groove of less depth than the height of said flange and said casing having its end fitted into said groove and enveloped by said flange.

2. In a storage battery, the combination of a tubular casing formed of insulating material, positive and negative plates within said casing, an insulating closure member having a filler opening therein secured to one end of said casing, a terminal member carried by said insulating closure member, a metal closure member having an annular peripheral flange cemented to the other end of said casing, a baffle adjacent to one end of said plates and secured to the inner wall of said casing, lugs on said plates passing through said baffle, a strap connected to the lugs of the plates of one polarity, a connector connected to one of said straps and to said terminal member, insulating means within said closure member for spacing said plates connected to said strap from said metal closure member, a second strap connected to the lugs of the plates of opposite polarity, and means for connecting said last-mentioned plates to said metal closure member, said metal closure member having inside of said flange a groove of less depth than the height of said flange and said tubular casing having its end fitted into said groove and enveloped by said flange.

JOHN R. SMYTH.

REFERENCES CITED

The following references are of record in the file of this patent:

UNITED STATES PATENTS

| Number | Name | Date |
|---|---|---|
| 1,654,823 | Millar | Jan. 3, 1928 |
| 2,315,592 | Cargill | Apr. 6, 1943 |
| 406,223 | Lee | July 2, 1889 |
| 734,896 | Lammerts | July 28, 1903 |
| 1,732,158 | Ford | Oct. 15, 1929 |
| 1,481,226 | Rhodes | Jan. 15, 1924 |

FOREIGN PATENTS

| Number | Country | Date |
|---|---|---|
| 537,102 | British | June 9, 1941 |
| 550,951 | British | Feb. 2, 1943 |
| 671,707 | French | Sept. 7, 1929 |